UNITED STATES PATENT OFFICE.

ROBERT H. HUTCHINSON, OF NEW YORK, N. Y., ASSIGNOR TO THE SWAN & FINCH COMPANY, OF SAME PLACE.

LUBRICANT FOR FIBERS.

SPECIFICATION forming part of Letters Patent No. 661,473, dated November 6, 1900.

Application filed February 14, 1900. Serial No. 5,200. (No specimens.)

*To all whom it may concern:*

Be it known that I, ROBERT H. HUTCHINSON, a citizen of the United States, residing in the city, county, and State of New York, have invented certain new and useful Improvements in Compounds for Oiling Wool Fiber for Spinning and for other Purposes, of which the following is a specification.

Wool fiber is oiled before being carded to prevent the flying of the fibers and to facilitate their adhesion in the making of yarn. Oil applied for this purpose must be subsequently eliminated by washing, and it is desirable that only so much should be used as is requisite to effect the required behavior of the fibers both in carding and in the manufacture of the yarns.

This invention comprises a novel compound for this purpose that has advantages over those heretofore employed. Wool-grease contains about thirty per cent., more or less, of neutral fat that is not saponified by the action of alkali and which, I have discovered by experiment and demonstrated by use, is specially adapted for treating wool fiber as above suggested. It is of a peculiar viscous or sticky or "tacky" nature and has a marked affinity for water analogous to that which glycerin possesses. The improved compound ready for use consists of neutral wool-fat, soap, and water.

Ordinary crude commercial "wool-grease" or "degras" obtained from the cleansing of wool fleeces has a rank and disagreeable odor, due to the presence of rancid fatty acids and impurities, and for this reason is objectionable.

The manner of producing my improved compound now best known to me is as follows: The fatty acids and impurities are removed from the degras or commercial wool-grease, leaving a neutral or non-saponifiable fat having the characteristics above suggested and free from objectionable odor and which may or may not be wholly or partially bleached. This fat may be obtained in several ways, among which the following may be mentioned: Commercial wool-fat is mixed with sufficient alkali, either hot or cold, so as to saponify the whole or greater part of the saponifiable portion and then mixed with benzin, naphtha, or gasolene. The mixture is allowed to stand until the dirt and saponified fatty acids drop to the bottom, leaving the non-saponified fat dissolved in the benzin, naphtha, or gasolene at the top, from whence it may be drawn and the benzin, naphtha, or gasolene distilled off. Another way is to mix the grease with sufficient alkali and water to saponify the whole or greater part of the saponifiable portion. The mixture is allowed to stand. The unsaponified fat rises to the top and is drawn off and repeatedly treated with pure water until substances soluble in water are removed. Then by heat or centrifugal force the last of the water is eliminated from the fat, which may then, if desired, be refined and bleached as other oils and fats are. This product readily mixes with pure cold water to the extent of forming a somewhat thick cream or paste, but not such a solution as is practically adapted for the proper treatment of wool fiber. Soap, preferably neutral or containing no free alkali, is melted or dissolved in water and mixed with the neutral wool-fat. In this operation I may for convenience use heat sufficient to melt the fat—say a temperature of about 109° Fahrenheit. Higher temperature is objectionable and is apt to injure the compound. The mixture of such wool-fat and soap dissolved in water is a substantially permanent and homogeneous one and remains so when cold or warm water is added. Owing to the characteristics of the fat the solution thereof in water is relatively very sticky or tacky, and consequently it is necessary to apply to the wool fiber only a very small quantity, and the great affinity of the compound for water permits the use of large quantities of water and affords a very thin milk-like solution, which has in a marked degree the characteristics necessary for the treatment of the fiber, and yet in a given quantity of which only a very small percentage of the wool-fat is present. Moreover, the solution in water is a permanent one, which is only modified under all the general conditions of use by evaporation, and such modification, if it occurs, may be rectified merely by the further addition of warm or cold water. The solution is free from objectionable odors, which is not the case with many of the oil or grease compounds which have heretofore been used for the purpose suggested. Since this solution has the characteristics described, only a relatively small quantity thereof need be applied to the wool fibers, and a minimum quantity of fat to effect the end desired is therefore deposited upon the fibers. It may therefore be removed from the yarn by washing with facility.

I may supply to the trade the compound composed of wool-fat and soap dissolved in water, and each user may add at his pleasure such quantity of warm or cold water as will produce a solution of such fluidity and of such character as is adapted to the wool stock to which it is to be applied, or the compound may contain a further quantity of water and the user thereof may add what additional quantity is desired for his purpose, or I may supply to the trade complete solutions of different standard grades or characteristics adapted to what are known to be the general requirements of the mills, or the compound may be prepared at the mills by authorized users according to the instructions of this specification.

I may say generally, at the expense of repetition, that the solution contemplated by my invention has the following advantages: It is cheaper for the consumer, because of the small cost of wool-fat and the fact that to produce a given result less wool-fat is employed than has been necessary where other greases or oils have been employed, there is less grease to be washed out of the yarn, and for this reason the washing operation is one more readily and perfectly accomplished, and it is not necessary in such washing operation to employ alkali in such quantity as to impair the fibers as regards either their physical characteristics or their qualities discernible either by the eye or by touch, there are no objectionable odors, and, finally, the compound may be used by the mills with certainty of uniformity of result and with economy, facility, and convenience as compared with the use of compounds heretofore employed.

I have stated that the wool-fat and soap might be mixed while subjected to a moderate degree of heat and that a high degree of heat is objectionable. I may, however, mix these two ingredients at their normal temperatures and without the application of artificial heat, and in preparing the solution for use in the mills the water and compound may be and preferably are mixed at their normal temperatures. This is not only a convenience in the operation of mixing, but, moreover, in my opinion the best results are so obtained.

The proportion of soap to fat may vary to a wide extent according to the stock to be treated and the special desires or purposes of the users. There may be, for instance, about one part of soap to nine of fat, or about seven parts of soap to three of fat, or any other proportions between or on either side of those stated may be adopted, according to the exigencies of use. In all cases the compound will readily dissolve in warm or cold water, and a solution of any desired degree of fluidity be obtainable.

I have now described the elements of my invention; but I do not wish to be bound by the strict terms of the language I have employed, since it is quite possible that other ingredients might be added to the compound without defeating or destroying the characteristics which I have described and which will be present wholly or substantially in any such suggested modification of my invention.

I claim as my invention—

1. The compound consisting of an independently-made neutral soap mixed with wool-fat from which free fatty acids have been eliminated, substantially as set forth.

2. A compound composed of soap and wool-fat from which free fatty acids and impurities have been eliminated dissolved in water and adapted to the oiling of wool fibers, for the purpose described.

3. A compound composed of soap and wool-fat from which the free fatty acids and impurities have been removed dissolved in water at normal or substantially normal temperatures for the purposes described.

In testimony whereof I have hereunto subscribed my name.

ROBERT H. HUTCHINSON.

Witnesses:
EDWARD C. DAVIDSON,
C. D. LADLEY.